United States Patent

[11] 3,538,961

[72] Inventor Ralph E. Bruce
 6342 Seton Hill, Dayton, Ohio 45459
[21] Appl. No. 754,917
[22] Filed Aug. 23, 1968
[45] Patented Nov. 10, 1970

[54] REFRIGERATION SYSTEM SERVICING UNIT WITH DISPENSING PUMP AND CONNECTOR
 11 Claims, 5 Drawing Figs.
[52] U.S. Cl. .................................................. 141/61, 62/292, 103/38
[51] Int. Cl. .................................................. B67d 5/08, G01f 5/00
[50] Field of Search ........................................ 141/59, 60, 61; 62/77, 292

[56] References Cited
UNITED STATES PATENTS
3,055,402 9/1962 Schofield .................. 141/61X
3,302,421 2/1967 Karnes ...................... 62/292

Primary Examiner—Laverne D. Geiger
Assistant Examiner—R. J. Sher
Attorney—Norman R. Wissinger ABSTRACT: A servicing apparatus for refrigeration systems, particularly automotive air-conditioners, comprising a refrigerant supply reservoir, a novel metering liquid refrigerant dispensing pump characterized by a circumferentially split cylinder surrounded by a fluid chamber having two ports connected by conduits to said supply reservoir, a vacuum pump, and a connector yoke assembly. The connector assembly comprises a high-pressure chamber and a low-pressure chamber, each of which is associated with a pressure gauge and with a fitting for connection respectively with the high-pressure and low-pressure sides of the refrigeration system, a connector fitting and passage in communication with both of said chambers and adapted for selective association with the said liquid dispensing pump and said vacuum pump, and a valved passage allowing communication between said chambers when there is no pressure in either of them and for isolating the two chambers when a relatively higher pressure exists in the high-pressure chamber. The regrigerant dispensing pump is of the positive displacement volumetric variety wherein the total volume of refrigerant dispensed is dependent upon the number of cycles of pump operation, and automatic means are employed for counting such cycles and automatically stopping the pump when the proper number has been reached. The refrigerant dispensing pump may be provided with temperature responsive means for changing the effective volume of the cylinder within which the pump piston operates, whereby a constant weight of refrigerant may be dispensed for a given number of cycles, regardless of thermally induced changes in the density of the refrigerant.

Patented Nov. 10, 1970

INVENTOR
RALPH E. BRUCE

BY *Norman R Wiesinger*

ATTORNEY

Patented Nov. 10, 1970

INVENTOR
RALPH E. BRUCE

BY *Norman R Wissinger*

ATTORNEY

REFRIGERATION SYSTEM SERVICING UNIT WITH DISPENSING PUMP AND CONNECTOR

BACKGROUND OF THE INVENTION

1. Field of the Invention

The present invention is in the form of a servicing unit for refrigeration systems, especially air-conditioning systems such as those in automotive use, and is principally composed of a refrigerant supply reservoir, a metering and dispensing pump and a connector assembly to facilitate the operative association of the unit with the system to be serviced.

2. Description of the Prior Art

A common failing of closed refrigeration systems, particularly recurrent in automotive air-conditioners, is loss of the refrigerant fluid; and the repair and maintenance of such systems therefore regularly requires the replacement of such fluid. Because the refrigerant is necessarily characterized by low boiling point, high volatility, and high vapor pressure, the procedures and devices involved in such servicing have been complicated and have had to be carefully supervised and controlled. A particularly troublesome complication has resulted from the refrigerant's response to temperature changes, either as a matter of changes or differences in the ambient conditions under which the refrigerant is stored or supplied, or as a matter of heat developed by the operation of the mechanism to handle it. By way of example, the metering and/or dispensing pump which has been employed for such purposes in the past generates sufficient heat during operation that the refrigerant in the pump or in the immediate area of the pump has exerted a vapor pressure which is greater than that of the refrigerant in the supply vessel, as a result of which the desired movement of the fluid has been prevented, or at the very least has been difficult to maintain or to control with the degree of accuracy required.

Because the volatile refrigerant in any closed system, whether it be in the supply tank or in the refrigeration system being serviced, will exist partly as a liquid and partly in a gaseous state, it is the weight of the refrigerant introduced into the system which is the only precisely controllable factor. In response to this, the prior art has resorted to the two-step process of first isolating the desired weight of the refrigerant, and of then introducing the isolated faction into the system. Weighing techniques and devices being what they are however, purely gravimetric treatment of the refrigerant has not lent itself to automation and has required time-consuming interruptions in the servicing of a unit and in the manual performance of the weighing and isolating steps. At the same time, the apparatus has been expensive and cumbersome.

In what is perhaps the most popular variant of this prior art technique, for example, the desired weight of the refrigerant has been isolated volumetrically by the use of a volume measuring device with manual adjustment means for adjusting the volume for different temperatures to compensate for the different fluid densities at such temperatures. The use of this device has of course required a time-consuming interruption while the volume is being thus adjusted; and experience has shown that many servicemen will not take the time to make the adjustment, as a result of which a highly inaccurate charge may be used.

Perhaps a greater disadvantage of any of the prior art devices involving the pre-isolation of the desired amount of refrigerant, whether it is determined gravimetrically, volumetrically, or by a combination of both, is that the refrigerant thus isolated again exists as both a liquid and a gas within the isolation chamber, with the result that the removal of all of the isolated faction from the chamber and its insertion to the system is impossible, primarily because as refrigerant is withdrawn, the pressure within the chamber is steadily reduced. On a hot day for example, the removal of part of the refrigerant from the isolation chamber will cause the balance of the liquid remaining therein to boil off and the reduction in temperature attending the rapid evaporation lowers the pressure in the isolation chamber to the point that no flow can take place therefrom, even in response to pumping action. When this occurs, it has not been uncommon for the operator to invert the isolation chamber in an attempt to evacuate it by pouring the liquid directly into the system. When this is done, the liquid damages the valves in the system and washes away the lubricant on the parts thereof to the extent that in most cases the system is thereby rendered unworkable.

In other cases, the prior art has attempted to charge refrigeration systems by volumetric control of the refrigerant through the use of conventional positive-displacement metering and dispensing devices which have either been totally inadequate in reasonably controlling the amount of fluid supplied to the system or have required a variety of various auxiliary controls which have further complicated both the apparatus and the operating procedures. Particularly have the control problems been critical in the servicing of small refrigeration systems such as automotive air-conditioners in that they are generally operated by personnel who are not accustomed to precise manipulation and who, in most cases, do not have the time or the temperament to give the operation the constant attention it requires. For example, many of the prior art servicing units involve an auxiliary heating unit to bring the refrigerant in the supply reservoir to a known temperature sufficiently above ambient temperature that a pressure differential between the supply tank and the pump will be constantly maintained. This expedient is of course subject to the obvious objection that it artificially increases the pressure of the fluid being handled and, therefore, the problems of sealing the apparatus and preventing its explosion. Moreover, the heating unit itself requires sophisticated controls to insure proper temperature of the refrigerant supply over the broad range of ambient temperatures that are likely to be encountered. The particular severity of such problems in servicing automotive units, for example, is apparent when it is considered that much servicing will be done out-of-doors where the supply tank may normally be relatively cold and considerable time will be required to bring it to the temperature at which satisfactory operation can be expected.

In addition to all of the foregoing, when it is considered that the refrigeration systems to be serviced by the device of this invention are themselves designed to handle the refrigerant under both the high pressures of compression and the low pressures of evaporation and heat removal and must therefore be carefully manipulated while refrigerant is being evacuated or introduced, it can be seen that the mere association of any servicing unit with such a system can require detailed skills not normally possessed by automotive-service personnel. The effect of such complications, added to those derived from the nature of the refrigerant above outlined, has been that effective repair of automotive air-conditioners has heretofore been achievable only in manufacturing plants or in carefully supervised servicing stations wherein constant attention is given to the training of servicing personnel.

SUMMARY OF THE INVENTION

It is accordingly an object of the present invention to provide an improved, simplified apparatus for the servicing of refrigeration systems, particularly air-conditioners of the type employed in motor vehicles.

Yet another object of the invention is to provide a novel metering and dispensing pump for refrigerants and other fluids characterized by low boiling point and high volatility, which is capable of metering and dispensing a controlled volume of such fluid while maintaining the same in a liquid state without the necessity for auxiliary temperature and pressure control devices.

Still another object of the invention is the provision of a refrigerant metering and dispensing refrigerant pump capable of supplying a carefully controlled weight of refrigerant material, which, though measured volumetrically, will remain constant in spite of thermally induced density changes thereof.

Still another object of the invention is the provision of a servicing apparatus for selectively evacuating and charging a refrigeration system such as an automotive air-conditioner which may be simply and conveniently associated with the system to be serviced and will require a minimum of attention and skill on the part of the user.

To achieve these and other objects which will appear from the following disclosure, the invention embodies first a novel refrigerant storage, supply, metering and dispensing assembly comprising a novel metering and dispensing pump characterized by a filling or input passage and a vapor-releasing, bubble-return outlet or passage, both in association with a relatively elevated supply tank or reservoir from the bottom of which the refrigerant liquid will flow gravimetrically through the input passage into the pump and the released vapor will rise to emerge within the reservoir at a point above the level of the liquid refrigerant therein. The pump itself is of the positive displacement, reciprocating piston variety which departs however from the prior art in that the cylinder in which the piston moves comprises two separate sections which are axially spaced within a jacket which defines a liquid-filled chamber around at least that portion of the cylinder to be filled with fluid under the influence of the piston and the circumferential opening into the cylinder defined by the axially spaced sections thereof. The liquid-filled chamber thus defined has two ports; viz., an inlet port which is connected by a suitable conduit to the lower portion of an elevated refrigerant supply tank or reservoir at a point below the liquid level normally maintained therein, and a vapor-release or bubble-return port, which is connected by a suitable conduit to the elevated supply tank at a point thereon above the level of liquid normally maintained therein. In lieu of connecting the vapor-releasing bubble-return conduit directly to the upper portion of the supply tank, the conduit may be associated with an opening in the supply tank at or near the bottom thereof, which, however, is supplied with a stack or conduit extension which rises through the liquid maintained therein and is vented to the gaseous atmosphere within the tank but above the liquid. At all times during its operation, the pump is so mounted that the vapor releasing port of the chamber is elevated relative to the inlet port.

The two segments of the cylinder of the pump as above described are axially aligned and may be characterized as a first piston or plunger-housing segment and a second metering and dispensing segment. While the first of these corresponds somewhat to conventional piston pumps wherein packing and sealing means are contained for isolating the piston during its reciprocating movement therein, the second or metering and dispensing cylinder is provided with a novel concentric cylindrical extension sleeve slidable therein, in response to the movement of the piston. This arrangement of components is such that as the piston moves forward the periphery of its face or head engages or seats against the opposed edge or face of the slidable cylindrical extension sleeve, thereby to close the metering forward chamber in which the extension slides. As the piston then moves forward, it pushes the slidable extension ahead of it for the balance of its stroke, thereby to displace the fluid from the chamber in which it has been previously measured. Upon the completion of the displacement cycle, the piston returns to its original position and means are provided to the end that, while the piston is returning, it will cause the slidable extension to return to its original position. One such means comprises an extension of the piston rod beyond the face of the piston and into the slidable extension sleeve and a cross pin carried by such rod and engaging slots in the wall of the extension, the slots being sufficiently elongated that they will not interfere with the firm abutting engagement between the piston and the extension, as the measuring chamber is closed, but will be engaged by the pin on the return stroke of the piston to be thereby returned to the exact position at which the extension existed prior to its abutment by the piston. Because the piston thus reciprocates across the space separating the two cylinder segments, whenever the piston is in its rearmost position, the measuring chamber within the forward cylinder segment is free to fill with the liquid refrigerant moving from the supply tank through the inlet conduit and port into the fluid chamber surrounding the cylinder without the need for spring-loaded valves, etc. At the same time, while the piston is in its rearward position, the residue of fluid within the measuring chamber is completely exposed to that within the chamber surrounding the cylinder, so that any vapor in the form of bubbles such as might have been developed by the generation of the heat of the pumping can freely pass upwardly through the liquid and out the vapor-release or bubble-return port and back to the supply tank. This vapor release not only insures a bubble-free liquid within the pump, but also transmits the vapor to the supply tank to increase the pressure upon the liquid there to preserve it in its liquid state and to insure that all of the fluid moving through the inlet conduit will be under greater pressure than that within the chambers of the pump. Toward the same end, the fact that the portion of the cylinder subjected to the pressure of the dispensing movement of the piston is completely surrounded by the refrigerant, which is in free communication via the two conduits with the supply tank, insures that any heat developed during the pumping operation will be readily carried from the pumping area, where the greatest heat is likely to be generated, to the supply tank, thus tending to maintain the temperature of the entire fluid the same and preventing any temperature induced pressure increases of the fluid in the pumping area compared with that in the supply tank.

Thus it can be seen that the pump of the present invention, by virtue of its large annular opening through which the liquid passes into its metering chamber eliminates the need for spring-loaded or pressure-actuated valves, thereby allowing unrestricted flow of the liquid even under the smallest pressure differential. At the same time it utilizes the hydrostatic head of the liquid to insure a constant pressure differential between the supply and the pump to promote a reliable liquid flow. Additionally, the novel construction not only tends to eliminate temperature differentials in the fluid throughout the supply, metering and dispensing assembly but also minimizes the effects of such temperature differentials as do occur.

In a modification of the pump according to this invention further means may be readily adapted for automatically compensating for thermally induced density changes in the fluid so that the metered volume displaced on any one cycle of the pump will automatically increase as the liquid density decreases, or vice-versa, so that each stroke of the piston will displace exactly the same desired weight of the refrigerant. In this manner, it is only necessary to control the number of discharge cycles of the pump to insure that a reasonably accurate weight amount of the fluid will be placed into the refrigerating system. The volume adjustment is achieved by constructing the above-mentioned cross pin of a bimetal or other thermally responsive material such that, as the temperature of the fluid increases (whereby its density will decrease and a greater volume must be measured for a given weight) the pin will become rearwardly bowed so that upon the return stroke of the piston, the cylindrical extension sleeve will be pulled farther into the space between the cylinder segments, thereby effectively increasing the volume of the liquid that will be within the forward cylinder segment when it is closed by contact with the forward-moving piston. Conversely, if the liquid is relatively cooler and more dense and a lesser volume of material is to be metered by each piston stroke, the cross pin will have become forwardly bowed, so that upon the return stroke of the piston the extension sleeve will not have returned so far, and a smaller chamber will be defined upon contact of the piston head with the extension sleeve.

The refrigerant supply dispensing and metering assembly above-described is such that it can be conveniently installed in a portable unit in combination with a vacuum pump for use in directly, quickly and positively evacuating the system of refrigerant before the new charge is to be introduced. For accomplishing the sequential association of the evacuating and filling means with the automotive air-conditioning system, the present invention also comprises connector means in the form of a connector yoke assembly having a high-pressure chamber and a low-pressure chamber, each of which is associated with a pressure gauge and with a fitting for connection respectively with the high-pressure and low-pressure sides of the air-conditioner compressor. The yoke carries a connector fitting and passage in communication with both of said chambers and adapted for selective association with liquid-dispensing pump and the vacuum pump, and is further characterized by a valved passage communicating between the high-pressure and low-pressure chambers therein so that they will be in communication when a vacuum is drawn through the connector passage but the low-pressure chamber will be isolated upon the application of pressure to the connector passage.

The invention thus generally described may be more clearly understood by reference to the following detailed description of certain specific embodiments thereof, in connection with which reference may be made to the appended drawings.

DESCRIPTION OF THE PREFERRED EMBODIMENTS

Figure 1:
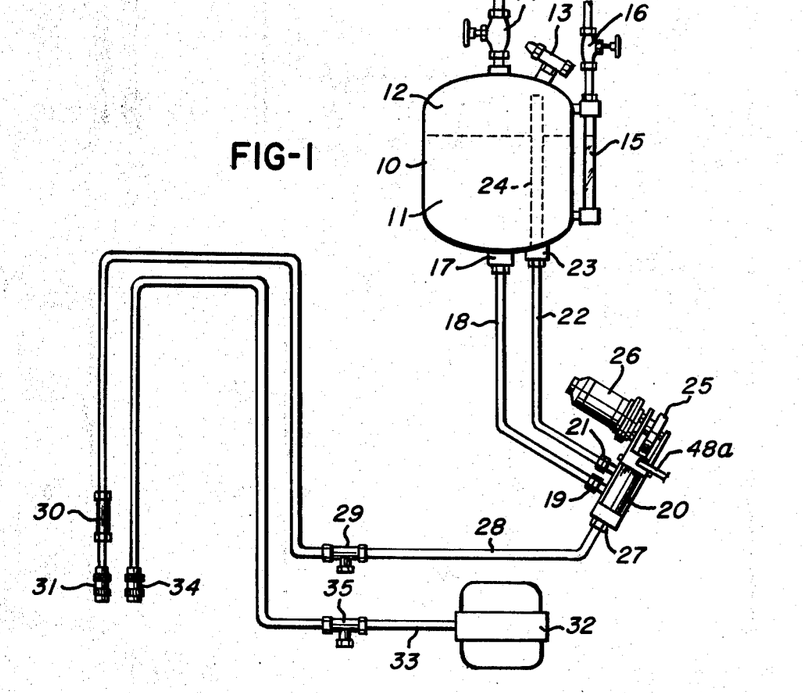
FIG. 1 is a schematic illustration of a refrigeration system servicing apparatus according to the present invention.

Referring now to FIG. 1, the servicing apparatus of the present invention comprises a refrigerant supply tank or reservoir 10 which is a closed chamber for housing the supply of refrigerant which exists within the closed tank in the form of a liquid 11 and a gaseous phase 12. For safety and convenience the tank may also be provided with a pressure-relief valve 13 to protect against excessive pressure build up which might cause explosion, a bleed valve 14 to relieve the vapor pressure within the tank, as for example to facilitate the filling thereof, but which is normally closed, and a sight glass 15 in communication with the interior of the tank 10 to serve as a liquid-level indicator. A filling conduit or fitting having a fill valve 16 may be employed for filling the tank via the ports at which the sight glass communicates with the interior.

At or near the bottom of the tank 10 is the supply or pump fill line fitting 17, which via the filling conduit 18 is associated with the inlet port 19 of the pump 20. As illustrated, the pump is positioned below the supply tank 10 so that the hydrostatic head of the liquid within the conduit 18 and the container 10 will promote the flow of the liquid into the pump under the influence of gravity. The pump 20 is also provided with a vapor-release or bubble-return outlet 21, which, via the vapor-release conduit 22, is associated with another fitting 23 associated with an opening in the tank 10 which is either above the level of the liquid normally maintained therein or is extended to a point above such liquid level by a stack such as 24 extending upwardly through the liquid in the tank and opening into the gaseous atmosphere above it. The pump, to be described in greater detail, is a reciprocating positive-displacement piston pump driven by the eccentric or cam 25, which is rotatably driven by the electric motor 26. The discharge valve and fitting assembly 27 of the pump is supplied with a discharge conduit 28 which, again for the sake of safety, may be provided with a high-pressure (on the order of 600 pounds per square inch) pressure relief valve 29, and to insure that the discharge conduit 28 will be completely filled with liquid at the time the charging operation begins, a low-pressure "charge-relief valve" 30. The end of the discharge conduit is supplied with a female quick-connector fitting 31, ultimately to be connected to the high-pressure side of the refrigeration system to be serviced and, in the case of the present invention, to be so connected via a connector yoke assembly to be described in greater detail. The apparatus also includes a motor-driven vacuum pump which, via the vacuum line and the female quick connecting coupler at the end thereof, is ultimately associated with both the high and low sides of the refrigeration system being serviced and again, in the case of the present invention, is so connected by a connector yoke assembly. The vacuum line 33 may also be provided with a pressure-relief valve 35 operable at a very low pressure, upon the order of 1 pound per square inch, to protect against damage if the system is for some reason under pressure when the vacuum pump is connected.

Figure 2:
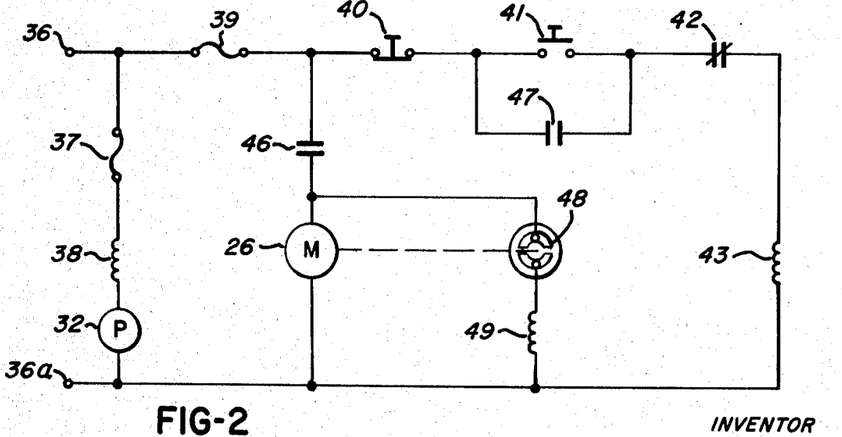
FIG. 2 is a wiring diagram of the electric circuitry for energizing the unit illustrated in FIG. 1.

The above-described components are electrically energized for operation according to the wiring diagram illustrated in FIG. 2, wherein the electrical energy is introduced to the circuit at the terminals 36 and 36a corresponding to the prongs of a conventional power plug. The motor of the vacuum pump 32 is energized by a first circuit component consisting simply of the fuse 37 and the conventional starting relay 38 and, as shown, may be so arranged that the vacuum pump operates at all times that current is supplied to the system, allowing it to stay heated to reduce the contamination of the pump oil by refrigerant, air, moisture, etc. An indicator light may also be supplied in this circuit to show that the total apparatus is being supplied with the necessary electrical power.

The pump motor 26 is a conventional alternating current electric motor, the circuit for which comprise the fuse 39, the normally closed stop switch 40, the normally open start switch 41, the counter switch 42, and the starting relay 43. With power supplied across the main power terminals 36 and 36a and the starting switch 41 and counter switch 42 in closed position starting relay 43 will close and electricity will flow through the entire circuit of the pump motor 26, thereby driving the same. The actuation of the starting relay 43 energizes the auxiliary contacts 46 and 47 so that the starting switch 41 will be bypassed and electric current will flow through the pump motor circuit, even after pressure is removed from the starting switch 41 and it opens. At the same time, the closing of the auxiliary contacts 46 energizes the pump stroke switch 48 and the pump stroke counter solenoid 49, which, along with the counter switch 42, are part of the digital counter which may be mechanically coupled with the pump by a finger such as 48a (in FIG. 1) which is moved each time the eccentric movement of the cam on the pump drives the piston. The counter may be set for a given number of pulses or pump cycles at the conclusion of which, after each cycle has been counted by the mechanical coupling of the pump to the pump stroke switch 48, will cause the counter switch 42 to open, thereby breaking the circuit powering the pump 26 and causing it to stop. The counter switch, which is a mechanical part of the digital counter, is such that at any position other than zero, it will be closed. Thus, if the counter is set at 200, the switch will be closed and the actuation of the start button will cause the refrigerant pump 26 to be energized and to run through 200 cycles which will be sensed by the stroke switch 48 and its solenoid 49 until the counter returns to zero, at which point the counter switch 42 will open and the pump will stop. If it is desired to stop the pump before the 200 strokes have been counted or at any time during the counting thereof, depression of the stop switch 40 will break the circuit and stop the refrigerant pump which may be again started however and will operate for the remainder of the previously desired number of pulses determined by the original setting of the counter until the counter reaches zero, at which point the switch 42 will open and the circuit be deenergized.

Figures 3, 4:
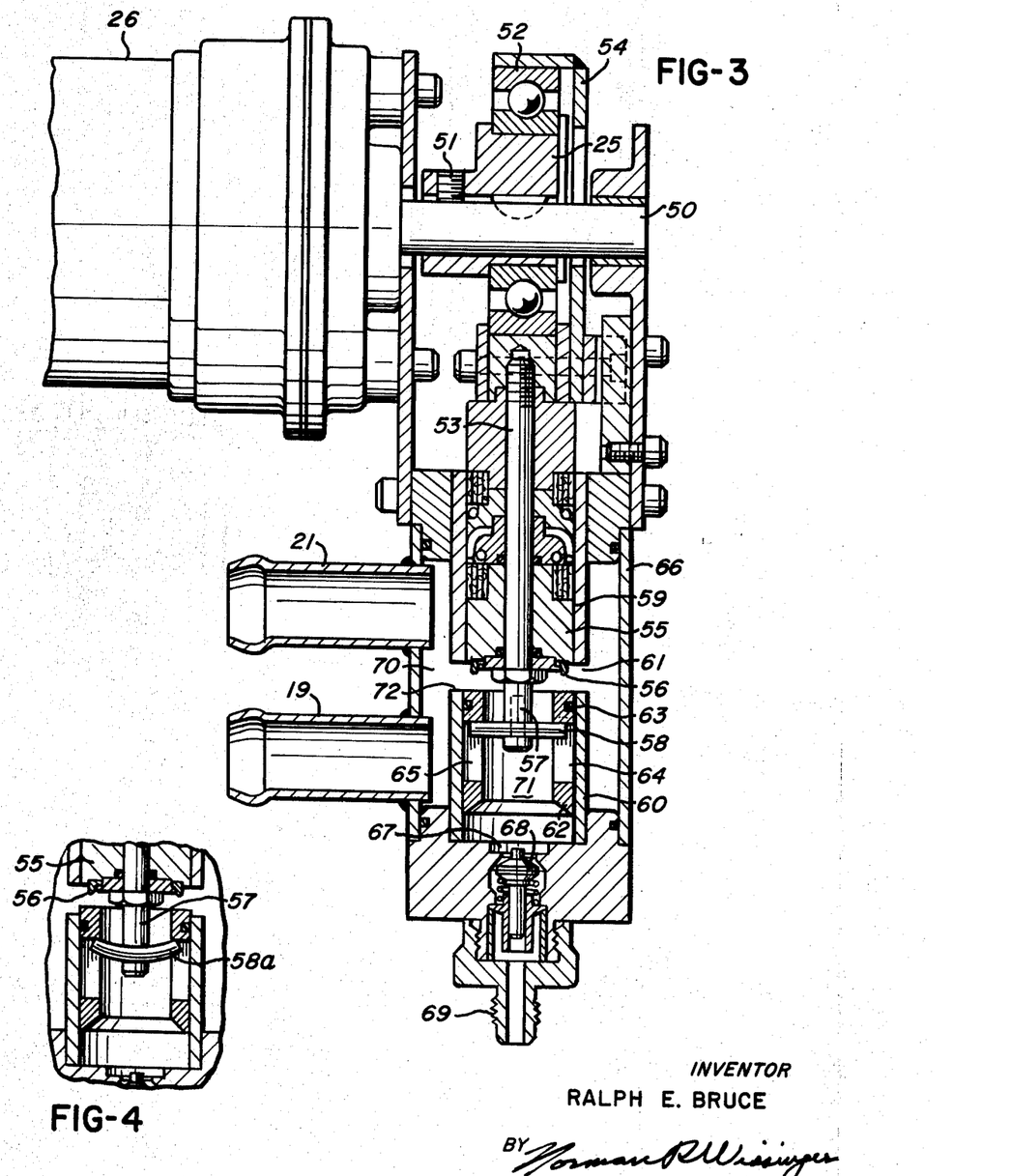
FIG. 3 is a plan view in partial cross section of the novel metering and dispensing pump according to the present invention.
FIG. 4 is an enlarged fragmentary view in cross section of the forward end of the piston illustrated in FIG. 3, modified to provide the temperature compensation feature of the present invention.

Referring now to the more detailed illustration of the pump 20 in FIG. 3, the same is driven by the motor 26 and its rotatably driven shaft 50, to which is affixed, as by the set screw 51, the cam or eccentric 25 within the ball bearing assembly 52 whereby the rotary motion of the drive shaft is transmitted into reciprocal motion in the plane of movement of the piston rod 53, such movement being actually accomplished by the response of the shell 54 (to which the piston rod is affixed) to the movement of the cam 25 transmitted through the bearings 52. At the forward end of the piston rod 53 is what may be considered a conventional piston 55, except that it is provided on its face with seating and abuttment means 56 to be hereinafter explained. Contrary to the usual case, however, the piston rod does not terminate at the principal piston 55 but extends therethrough and projects therebeyond in a piston rod extension 57 to the forward end of which is affixed a transversely extending bar or pin 58. In the illustration of FIG. 3 the piston is in its most completely withdrawn position and as the cam or eccentric 25 is rotatably driven, its association with the piston rod via the bearings 52 and shell 54 will cause the rod and the piston 55 to move forward from the position shown and then return in what represents one complete metering and dispensing cycle. The rod to the rear of the piston is provided with conventional packing, bushings, etc. to insure a liquid-tight seal therearound, in spite of the axial movement of the rod through the sealing means.

Of particular significance to the present invention is the fact that the cylinder in which the piston moves is composed of two axially aligned but axially spaced segments 59 and 60 which, taken together, might be regarded as a split cylinder characterized by the circumferential gap 61. As can be seen, the piston rod is principally mounted and housed within the rearward cylinder segment 59, and the piston head 55 itself resides therein when the rod is in its completely withdrawn position. As the piston 55 moves forward under the influence of the eccentric motion, however, it moves into the forward cylinder segment 60, wherein the actual metering and dispensing action takes place in a manner to be hereinafter described. An important feature of the forward cylinder segment 60 is the slotted extension sleeve 62 which may be regarded either as an extension of the piston head 55 or an extension of the forward cylinder segment 60. The extension sleeve 62 is nonetheless slidable within the forward cylinder segment 60 and is of such a diameter that its outer surface is in contact with the inner surface of the cylinder segment 60, to the extent that the contact does not substantially interfere with the sliding motion of the sleeve 62 on the one hand and that the use of conventional rings or circumferential seals such as 63 will provide a fluid-tight association between the contacting surfaces. The extension sleeve 62 is provided at opposite points on its wall with the elongated slots 64 and 65, in which the cross pin 58 will freely move during a part of its movement in response to the reciprocation of the piston rod 53 and its extension 57. In this regard it is to be noted that the length of the pin exceeds the inside diameter of the extension sleeve (whereby it may abut against the extremities of the slots), but is of course less than the inside diameter of the main cylinder segment 60.

The components providing the cylinder segments 59 and 60 are held in their axially aligned and properly spaced relationship by the pump body cylinder or jacket 66, which is completely closed around the cylinder segments except for the two openings to accommodate the inlet fitting 19 and the bubble-return fitting 21 previously described. The cylinder body 66 thereby defines a liquid chamber surrounding substantially all of the cylinder segments 59 and 60, and what is of critical importance, completely surrounds the circumferential gap 61 between the two segments and the forward cylinder segment wherein the metering and dispensing is to take place. It is also to be observed that in the manner of conventional pumps, the forward cylinder segment is in communication with a discharge or dispensing port 67, which is provided with a pressure-relief valve 68, which is normally closed and opens only as pressure is applied under the influence of the forward motion of the piston acting against the liquid within the forward cylinder segment 60, to allow the liquid in the pump to be discharged through the discharge conduit fitting 69.

Considering now the operation of the pump illustrated in FIG. 3, it is to be recalled from the description of FIG. 1 that the refrigerant liquid from a supply source is caused to flow, principally under the influence of gravity, through the pump-filling conduit 18 and the inlet fitting 19, whereupon it will completely fill the chamber 70 defined by the pump body 66 and the cylinder segments 59 and 60. In addition, however, when the piston 55 is in its rearward or beginning position, as shown in FIG. 3, the liquid can freely pass through the cylinder gap 61 and occupy the chamber within the forward cylinder segment 60 as it is modified somewhat by the presence of the extension sleeve 62. In this regard the gap 61 may be considered as the equivalent of the inlet port for the measuring-dispensing chamber 71; but it is to be observed that it is characterized by the important differences that it requires no valving or other pressure actuated means to permit the flow of the liquid into the chamber 71 and that it is substantially larger than inlet ports customarily employed, so that complete filling of the chamber is assured, even where the pressure differential or hydrostatic head promoting the flow of the liquid is normal. Reference to FIG. 1 will also disclose that, since the bubble-return fitting 21 is also in communication with the refrigerant supply the liquid will flow freely into the bubble-return fitting 21 and the vapor-release line 22.

During its intake stage, when the piston is in its rearward position as shown in FIG. 3, the liquid refrigerant is free to flow under very little pressure differential into the metering chamber 71 to completely fill the same. Then, as the piston 55 moves forward, its face 56 will abut against the opposite face 72 of the extension sleeve 62 which, because of the liquid seal between the outer face of the extension sleeve 62 and the inner surface of the cylinder segment 60, will completely enclose and precisely define the volume of the metering chamber 71. Then, as the piston continues its forward movement, its influence is transmitted as hydraulic pressure to open the discharge valve 68 and allow the refrigerant liquid to flow through the discharge conduit fitting 69 in a precisely measured amount established by the closure of the chamber 71 effected upon the contact of the piston with the extension sleeve and the forward movement of the piston thereafter, which movement is of course a constant for each cycle and can be closely predetermined and calculated as a matter of the pump design. As the piston moves forward, it will also move the extension sleeve forward, preferably to the point at which the forward end of the extension sleeve is at or near the forward face of the cylindrical chamber 71. It is to be noted that the spacing between the cross pin 58 and the face of the piston 56 is such, relative to the length of the slots 64 and 65 in the extension sleeve, that the cross pin 58 will not contact the forward edges of the slots 64 and 65, because the extension sleeve will be constantly urged forward by its contact with the piston face 55 rather than any contact between its slots and the cross pin. Once the piston has achieved its forwardmost position, however, the hydraulic pressure upon the liquid refrigerant remaining in the chamber will be removed, whereupon the discharge valve will close and the piston will commence its withdrawal, during the course of which the piston face 56 will separate from the extension sleeve 62, which will therefore remain unmoved from its forward position within the forward cylinder segment 60 until such time as the rearwardly moving piston brings the pin 58 into contact with the rear ends of the slots 64 and 65. The continued rearward movement of the piston will then slide or drag the cylinder extension back to the predetermined position at which it is shown in FIG. 3, where the pumping cycle is ready to begin again, and the annular opening between the two cylinder segments is again opened to allow the free and unrestricted flow of the fluid into the metering and dispensing chamber 71.

A unique feature of this pump which makes it particularly adaptable for use with low boiling point liquids, in addition to the fact that it can accommodate the movement of such liquid under very nominal pressure differentials, is the fact that the construction and arrangement of parts allows the principal working area of the pump, especially the area surrounding the cylinder wherein the movement of the piston takes place, to be completely surrounded by the fluid itself. The fluid in this location acts as a heat removal medium, thereby preventing the temperature in the working area of the pump from becoming so great as to cause any counter pressure to flow of the liquid. Of course, as the low boiling liquid picks up heat, as for example in the area surrounding the forward cylinder segment 60, it has a tendency to vaporize, and again the construction and arrangement of parts according to the present invention provides a unique advantage in that the vapor, which is in the form of bubbles, is free to rise (keeping in mind that the pump is always mounted at such an angle that the vapor release fitting 21 is above the inlet fitting 19) so that the bubbles and the increased vapor pressure they represent are free to rise through the bubble-return fitting and conduit up to the supply reservoir, wherein the vapor will occupy the space in the reservoir above the liquid level, thereby adding to the pressure tending to promote the desired liquid flow, rather than to detract therefrom.

In a modification of the pump according to the present invention, demonstrating its unique adaptability to the handling of refrigerants or other liquids characterized by a high coefficient of thermal expansion, the cross pin 58a in FIG. 4 (corresponding to the cross pin 58 in FIG. 3) is composed of a bimetallic or other thermally responsive material so that, as its temperature becomes elevated for example, it will become rearwardly bowed or distended as shown. As the piston rod returns to its rearwardmost position, the effect of the pin thus bowed acting against the slots 64 and 65 will be to cause the extension sleeve 62 to return a greater distance toward the piston when it is at rest where the extension sleeve will remain until it is again closed by seating contact with the face of the piston 56. At this closure of the metering and dispensing chamber 71, since the extension sleeve extends beyond the extremities of the cylinder segment 60, the metering chamber is thereby nominally enlarged. When it is considered that the pin 58a is constantly surrounded by the refrigerant being metered and dispensed, it follows that the pin will attain and maintain the temperature of the refrigerant even as it may rise or fall, and that, as the temperature rises, for example, and the refrigerant accordingly becomes less dense, the rearward bowing of the pin will cause an enlargement of the metering and dispensing chamber, which is directly proportional to the decrease of density of the liquid being measured and dispensed, so that regardless of the temperature of the refrigerant and its density, a constant weight of the liquid will be supplied upon each pumping cycle. Thus, although the pump is truly a volumetric pump, the automatic adjustment thereof to density changes is such that the pump may be considered to be gravimetric, at least to the extent that it dispenses a constant weight, regardless of volume change. This is true, of course, in the case of a reverse temperature change, wherein the liquid within the pump is lower than that at which it was designed to operate under normal conditions, as a result of which the fluid will be more dense and a small volume should be pumped for a given weight. In such circumstances, the bimetal element will become forwardly bowed, as a result of which, upon the return stroke of the piston, the extension sleeve will not be moved as far and will remain in fact in such a condition that, when it is contacted by the forward moving piston, a smaller metering chamber will be thereby defined and a smaller volume of the more dense fluid will thereby be discharged for the particular pumping cycle. The parts are of course so designed and calibrated that the reduction in volume precisely compensates for the increase in density with the result that the same weight of liquid will be dispensed.

Figure 5:
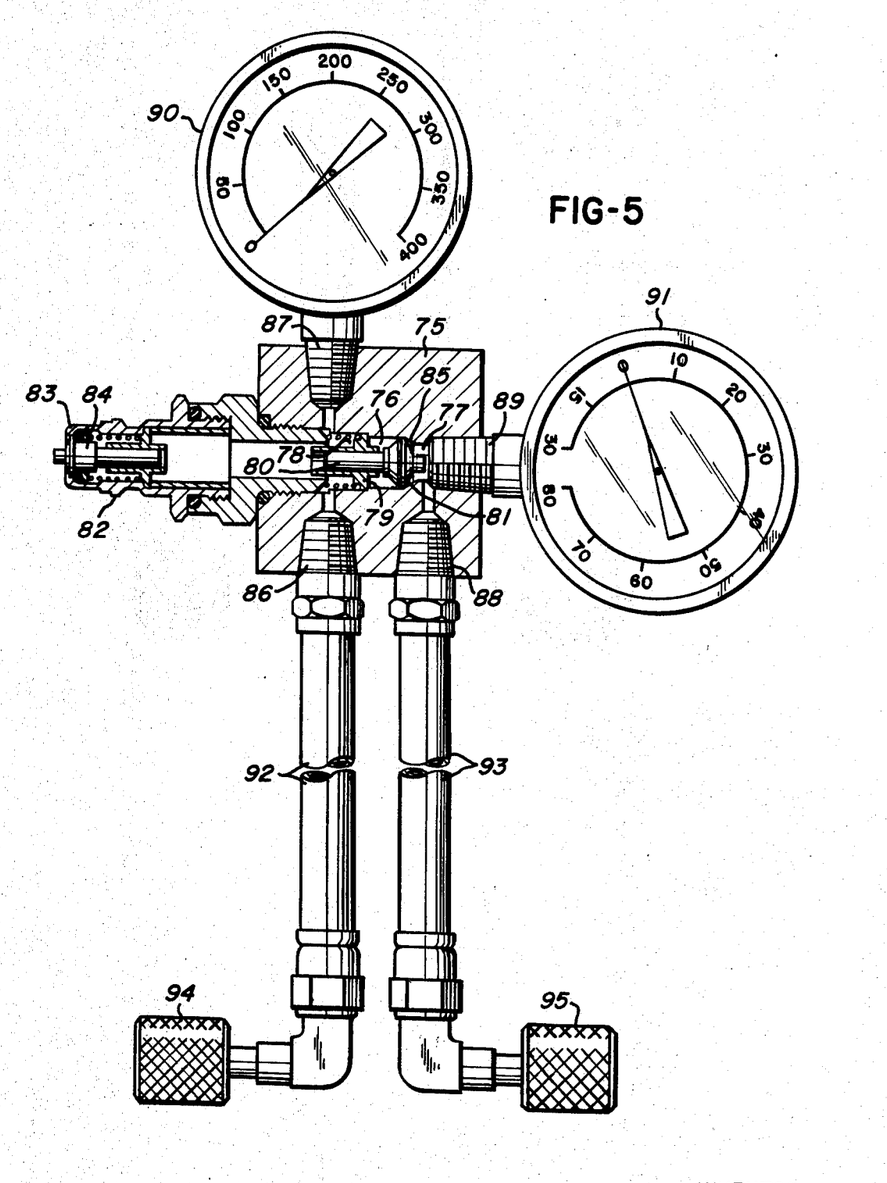
FIG. 5 is a plan view in partial cross section of the connector yoke assembly for associating the servicing unit of the present invention with a refrigeration system, particularly an automotive air-conditioner.

The apparatus heretofore described, including particularly the novel pump illustrated in FIGS. 3 and 4, and the vacuum pump assembled in a unitary structure may then be conveniently associated with a refrigeration system such as an automotive air-conditioner for servicing operation by means of the connector yoke assembly illustrated in FIG. 5. The connector yoke comprises a blocklike member 75, having a main bore or passage 76 which is divided generally into a low-pressure chamber 77 and a high-pressure chamber 78, which are separated by a valve mechanism comprising a valve-mounting sleeve 79 and a stemmed valve slidable therein, comprising a stem portion 80 and a seating portion 81 for seating against a suitably finished and positioned seating surface 85 within the passage 76. In fluid communicating relationship with the main passage 76 and projecting from the block is a connector coupling such as the male quick connector 82, which, in the well-known manner of quick disconnect couplers, is provided with a protruding seating surface 83, with valve means 84 opening thereon, so that upon the insertion of a companion female segment over the seating surface 83, the valve means 84 will be opened and there will be free fluid communication through the connector to the main passage 76. The operation of the valve components 79, 80, 81, and 85 is such that, when a fluid under pressure is introduced into the block via the connector 82 which is in direct communication with the high-pressure portion 78 of the main passage 76, the valve 81 will close against the seat 85, thereby isolating the low-pressure portion of the channel and keeping the pressure and the fluid under pressure confined to the high side 78. Conversely, if a negative pressure or a partial vacuum is created within the main channel 76 as by the connection of a vacuum pump hose to the connector 82, the valve component 81 will be withdrawn from its seat, and both the high and low-pressure sides of the channel within the connector block will be in free fluid communication with the connector and the pressure influences being introduced thereby. The high-pressure chamber 78 is also in fluid communication with a hose or hose-fitting receptacle 86 and a pressure gauge receptacle 87; and similarly, the low-pressure side is provided with a hose or hose-fitting receptacle 88 and a lower pressure gauge or fitting 89. The gauge receptacles 87 and 89 are then provided with the high-pressure gauge 90 and the low-pressure gauge 91 respectively and the hose receptacles 86 and 88 are then fitted with a high-pressure hose 92 and a low-pressure hose 93 respectively, which are in turn fitted at their opposite ends with suitable connectors 94 and 95 for releasable connection to appropriate fittings on the high side and low side respectively of the refrigeration system to be serviced.

In the servicing of a refrigeration system, such as an automobile air-conditioner, the connector assembly above described is first connected to the air-conditioner by the application of the connectors 94 and 95 to companion fittings associated with the high and low sides, respectively, of the unit. Since, before a precisely measured quantity of refrigerant can be introduced into the air-conditioner, all of the residual refrigerant as well as accumulated moisture and vaporous contaminants must be removed, the first operation is therefore the connection of the vacuum pump hose 33 in FIG. 1 via the female coupler 34 thereof with the male coupler 82 of the connector yoke block. The vacuum pump is thereupon operated until a constant relatively low pressure of on the order of 28.8 inches of mercury (depending upon the altitude and atmospheric conditions in which the system is being serviced) is achieved, whereupon the vacuum coupler is removed from the fitting 82, leaving the conduits 92 and 93, as well as the refrigeration system and the connector yoke block with which they are associated, enclosed and sealed off from the atmosphere. Under this condition, the low-pressure gauge may be observed for any noticeable rise for a period of approximately 60 seconds to detect any substantial leak in the system. While the pump is operating, the valve 81 is removed from its seat so that both the high and low-pressure sides of the system are exposed to the influence of the vacuum, thereby to hasten and facilitate the complete removal of moisture and noncondensibles from the system.

If no leaks are observed during the interval of the creation and isolation of the vacuum within the system, the quick connector female coupler 31 of the pump discharge conduit 28 is then connected to the male connector 82, and the pump caused to operate for the previously determined number of cycles necessary to provide the exact amount of weight of refrigerant desired in the system. The pump may be designed, for example, to deliver 1/100 of a pound of refrigerant upon each forward stroke of the piston; and the digital counter employed to monitor the strokes may be of the 3-column variety. Accordingly, if 3 pounds of refrigerant are desired, the counter may be set at 300 before the pump is activated by the pressing of the start button, thereby closing the electrical circuit energizing the motor, which continues to operate through the desired 300 cycles at which point the counter switch, having sensed the number of cycles through its electrical-mechanical connection to the pump, opens, to break the electrical circuit and stop the pump.

During the course of the filling stage, a more effective leak check may be made of the system by stopping the charging operation after a relatively small amount (on the order of one-half pound) of refrigerant has been introduced in the system. This may of course be achieved in the case of the embodiment here considered by simply pressing the stop button after the digital counter has indicated 50 pumping cycles have been completed. While the operation is thus stopped, conventional leak detecting devices may be used to trace the system for refrigerant leakage. If the system is found to be sound at this point, the balance of the desired full charge may then be transmitted by again pushing the start button and allowing the pump to continue to operate until the additional 250 pumping cycles have returned the counter to zero position, at which the counter switch opens and the pump is stopped.

Further advantages of the apparatus of the present invention reside in the fact that, while the refrigerant is being introduced into the system via the connector yoke block assembly described in connection with FIG. 5, the low-pressure side of the system, by operation of the valve 81, is completely shut off from the fluid flow. Because of this, all of the charging is done into the high side of the system, making the introduction of the refrigerant in its liquid stage feasible and unharmful. Because the prior art devices and procedures have required filling the high and low sides of the system simultaneously or filling the low side only, it has been necessary that the refrigerant be in a gaseous state at the time it is introduced, since liquid flowing into the low side causes damage of the parts therein and especially as to the compressor and a washing away of the lubricant necessary for the efficient operation of such parts. A further advantage of the apparatus of the present invention resides in the fact that, during and after the charging of the system, which may be accomplished even while the system is operating, the association of the high-pressure and low-pressure gauges 90 and 91 respectively with the high and low sides of the system while it is operating provide the opportunity for an easy inspection to determine whether the system is operating at the design pressures. This may be accomplished because the two sides of the system are isolated by the closure of the valve 81 both during and after the filling operation.

While the foregoing invention has been described in considerable detail in connection with a preferred embodiment and a modification thereof, it is to be understood that the foregoing particularization is for the purpose of illustration only and does not limit the scope of the invention as it is defined in the subjoined claims.

I claim:

1. A refrigeration system servicing apparatus comprising a refrigerant supply reservoir, a liquid metering and dispensing pump positioned below said reservoir, a vacuum pump, connector means for selectively and alternatively associating said metering and dispensing pump and said vacuum pump with the refrigeration system, wherein said metering and dispensing pump comprises a circumferentially split cylinder, at least the split portion of which is surrounded by a liquid chamber, at least the upper portion of which is provided with port means in fluid communication with said reservoir whereby liquid from said reservoir is allowed to flow freely into said chamber and the gas formed by the vaporization of said liquid in said chamber is allowed to flow freely upwardly into said reservoir, a positive-displacement piston reciprocally driven and so positioned within said cylinder that the face of the piston on each stroke thereof moves from a position rearwardly of the front edge of said split to a point substantially forward of front edge, a cylindrical extension sleeve in fluid-sealing engagement with and slidable within said cylinder forwardly of said split, said extension sleeve being positioned for seating and liquid-sealing contact with the piston face and for forward movement as the piston moves forward, and means for sliding said sleeve rearwardly as the piston moves rearwardly, whereby the reciprocal movement of the piston causes a corresponding reciprocal movement of the extension sleeve within the cylinder forwardly of said split.

2. A refrigeration system servicing apparatus according to claim 1 wherein said connector means are unitary means comprising a connector block having a high-pressure chamber and a low-pressure chamber, each of which is associated with a pressure gauge and with a fitting for conduit connection respectively to the high-pressure side and the low-pressure side of the system to be serviced, an intermediate passage connecting said chamber, a coupler fitting in fluid transmitting communication with both of said chambers adapted for selective association by conduit connection with said metering and dispensing pump and said vacuum pump.

3. A refrigeration system servicing apparatus according to claim 2 wherein said intermediate passage is provided with valve means which are normally open when there is no pressure or a negative pressure within either of said chambers but are closed upon the application of pressure to said high-pressure chamber thereby to isolate the same from said low-pressure chamber.

4. A refrigeration system servicing apparatus according to claim 1 wherein said port means comprise two ports in fluid communicating association with said reservoir and said liquid metering and dispensing pump is positioned that one of said ports is relatively above the other.

5. A refrigeration system servicing apparatus according to claim 4 wherein the upper most of said ports is connected to said reservoir by a conduit discharging into the reservoir at a point above the liquid level therein.

6. A refrigeration system servicing apparatus according to claim 1 wherein said means for sliding said sleeve rearwardly are thermally responsive and adjust the degree of rearward movement of the sleeve upon the rearward movement of the piston whereby an increase in temperature will cause the sleeve to move more to the rear and a decrease in temperature will cause the sleeve to move less to the rear thereby respectively increasing or decreasing the volume of the metering chamber partially formed by said sleeve upon its contact with the piston face and compensating for thermally induced changes in the liquid density whereby a constant weight of liquid will be dispensed upon each forward stroke of the piston regardless of its temperature.

7. A liquid metering and dispensing pump comprising a cylinder composed of coaxial and axially spaced front and rear hollow cylindrical sections, a jacket at least partially surrounding said cylinder including the space between said sections to form a liquid chamber therearound, port means in said jacket at least near the top of said liquid chamber in fluid communication with a liquid supply reservoir, a piston reciprocally driven and so positioned within said cylinder that its reciprocating movement carries the face thereof from a position rearwardly of the front cylindrical section substantially into said front section, a valved discharge outlet from said front section, a hollow cylindrical extension sleeve slidable within said front section, the outer surface of said sleeve being in fluidnsealing engagement with the inner surface of said front section, the rear face of said sleeve being positioned for abutment with the face of said piston upon its forward movement and the sleeve being forwardly slidable in response thereto, and means for causing said sleeve to slide rearwardly upon the rearward motion of the piston whereby, as the piston reciprocates within the cylinder, it will sequentially contact and form liquid-sealing seating engagement with said sleeve thereby enclosing a metering chamber within the front cylinder section, the piston and sleeve will move forward to dispense the metered liquid through said discharge outlet, and said sleeve will be returned to its original position whereupon the piston, in its rearward movement, will separate therefrom and move to the rear of said front section whereupon said metering chamber will be opened at said axial space between said sections to the fluid within said chamber.

8. A liquid metering and dispensing pump according to claim 7 wherein said port means comprise two ports, one of which is elevated relative to the other, whereby liquid may flow from said reservoir into said chamber and any gas formed by the vaporization of said liquid in said chamber may flow from said chamber into said reservoir via the relatively elevated of said ports.

9. A liquid metering and dispensing pump according to claim 7 wherein said means for causing said sleeve to slide rearwardly are associated with said piston and comprise a rod projecting forwardly from the face thereof and a cross-pin through said rod engaging diametrically positioned openings in the wall of said sleeve.

10. A liquid metering and dispensing pump according to claim 9 wherein said openings in the wall of said sleeve are elongated and the length thereof axially of the sleeve is greater than the distance traveled by the piston in moving from its rearward most position to the abutment of its face against said sleeve whereby said sleeve will move forwardly only in response to its abutting contact with the face of the piston, but will move rearwardly in response to the abutting engagement between said cross-pin and the rearward edges of said openings.

11. A liquid metering and dispensing pump according to claim 9 wherein said cross-pin is composed of a thermally responsive metal which becomes rearwardly bowed upon a temperature increase and forwardly bowed upon a temperature decrease.